United States Patent [19]

Popok

[11] 4,412,574

[45] Nov. 1, 1983

[54] ELEMENT FOR REMOVING DIRT OR SNOW FROM TIRE, AND TIRE PROVIDED THEREWITH

[76] Inventor: Gregory Popok, 8003 "B" Woodgate Ct., Baltimore, Md. 21207

[21] Appl. No.: 426,653

[22] Filed: Sep. 29, 1982

[51] Int. Cl.³ .................. B60C 27/00; B60C 11/00
[52] U.S. Cl. ................................ 152/151; 152/208; 152/210; 152/228
[58] Field of Search .............. 152/191, 185.1, 208, 152/220, 225 R, 225 C, 226–228, 173, 210; 280/158; 305/11–13

[56] References Cited

U.S. PATENT DOCUMENTS

| 2,441,656 | 5/1948 | Ansel | 152/228 X |
| 2,552,168 | 5/1951 | Goolsby | 152/228 |
| 3,043,356 | 7/1962 | Mayhercy | 152/208 |
| 4,246,946 | 1/1981 | Stinaff | 152/151 |
| 4,334,566 | 6/1982 | Augustine | 152/208 |

Primary Examiner—William A. Powell
Assistant Examiner—Thomas Bokan
Attorney, Agent, or Firm—Ilya Zborovsky

[57] ABSTRACT

A tire is provided with an element which cleans it during driving and is formed as a rigid substantially closed member fitted in a groove of the tire and movable radially outwardly during rotation of the tire to dislodge soil, snow etc. It may be provided with transverse portions and ground-engaging projections.

6 Claims, 3 Drawing Figures

ELEMENT FOR REMOVING DIRT OR SNOW FROM TIRE, AND TIRE PROVIDED THEREWITH

BACKGROUND OF THE INVENTION

The present invention relates to an element for removing dirt and snow from tires, and also to tires provided therewith.

It is known that dirt, snow and the like tend to adhere to the outer surface of the tires and fill their grooves. The tire covered with dirt and snow has worse engagement with the ground surface which substantially affects driving. When the tires is covered with dirt or snow to a certain extent, it is necessary to stop a vehicle and to clean the outer surface and desirably grooves of the tires. It is to be understood that cleaning during driving would be considerably more effective and acceptable. However, up to now known means did not allow to do so. No devices and methods have been proposed to clean the tires from dirt or snow during driving of a vehicle provided therewith.

SUMMARY OF THE INVENTION

Accordingly, it is an object of the present invention to provide an element for a tire, and a tire with such an element which avoids the disadvantages of the prior art.

More particularly, it is an object of the present invention to provide an element and a tire which allow cleaning of the tire during its running so as to eliminate excessive adherence of dirt or snow to the outer surface of the tire.

In keeping with these objects and with others which will become apparent hereinafter, one feature of the present invention resides, briefly stated, in an element which includes a substantially rigid member at least partially receivable in a circumferential groove of the tire and having an inner dimension selected so that when one portion of the element is received in the groove at the location of contact of the tire with the ground, it then moves after turning of the tire circumferentially with the latter and at the same time displaces radially outwardly so as to remove dirt or snow from the outer surface of the tire.

The thus designed element removes dirt and snow from the tire during driving.

Another feature of the invention is a tire provided with the above described element.

Still another feature of the present invention is that the member may be provided with one or several transverse members receivable in or withdrawable from the transverse grooves of the tire to provide the same effect as the first-mentioned member, but in a transverse direction of the tire outer surface.

A further feature of the present invention is that several members partially receivable in the circumferential grooves may be provided and connected with one another by transverse connecting members.

Still another feature of the invention is that the member or members may be provided on its or their outer surface with a plurality of projections arranged to engage soil or snow or ice etc.

The novel features of the present invention are set forth in the claims. The invention however will be best understood from the following description of preferred embodiments which is accompanied by the following drawing illustrating the subject matter of the invention.

DESCRIPTION OF PREFERRED EMBODIMENTS

Figure 1:
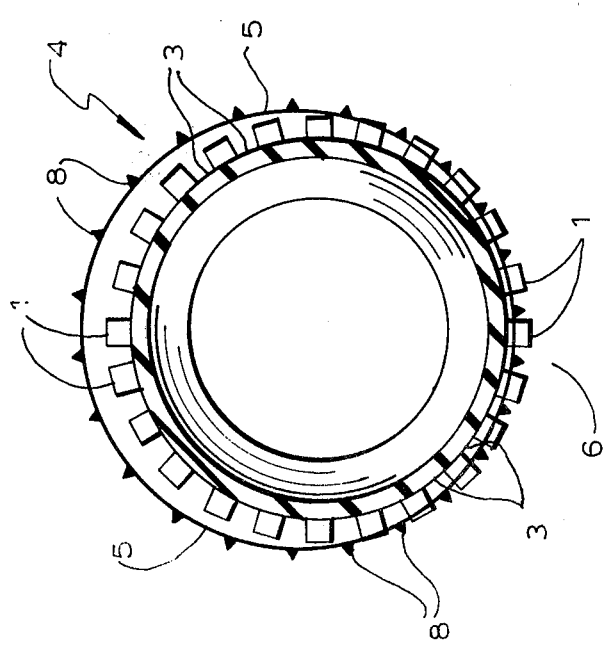
FIG. 1 is a side view of a tire provided with cleaning element in accordance with the present invention, in one of the embodiments.

FIG. 1 shows a tire which is identified by reference numeral 1. As can be more clearly seen from FIG. 2, the tire 1 has at least one circumferential groove identifed by reference numeral 2 and a plurality of transverse grooves which are identified by reference numeral 3.

An element for cleaning the tire 1 is identified as a total by reference numeral 4. The element 4 has a substantially rigid circumferentially extending and closed member 5. The member 5 can be composed of metal, plastic etc. The member 5 has such a thickness that it can be received in the circumferential groove 2 of the tire 1. The diameter of the member 5 is selected so that when its one portion at a location of contact of the tire with the ground, as identified by reference numeral 6, is pressed by the ground into the circumferetial groove 2, its another portion moves radially outwardly. The same is true with respect to the first mentioned portion located in the drawing in the area of contact 6. When upon turning of the tire this portion turns in a circumferential direction so that it is no longer clamped between the ground and the tire, it displaces radially outwardly. This radial outward displacement dislodges dirt or snow from the outer surface of the tire 1.

Figure 2:
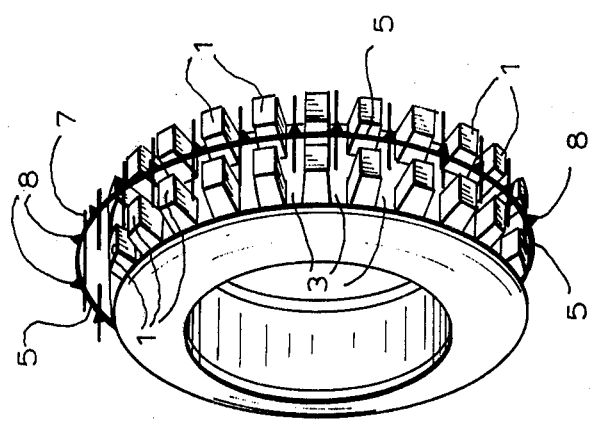
FIG. 2 is a perspective view of the tire with the cleaning element of FIG. 1.

Actually, in some cases especially when tires have a very small width, it can be sufficient to form the cleaning element 4 only from the member 5. However, in accordance with another advantageous feature of the present invention, a plurality of transverse members 7 are provided in the cleaning element 4. The transverse members 7 can be of one piece with the circumferential member 5. The transverse members 7 may be at least partially received in the transverse grooves 3 of the outer surface of the tire. During rotation of the wheel with the tire the transverse members 7 can also move radially inwardly under the pressing action of the ground in the contact region 6, and then radially outwardly to dislodge dirt, snow etc. The transverse members can be U-shaped so that two legs of each transverse member extend along axially opposite lateral sides of the tire, and a portion connecting the legs with one another extends in the transverse groove as shown in FIG. 2 only for the transverse member without the legs.

Figure 3:
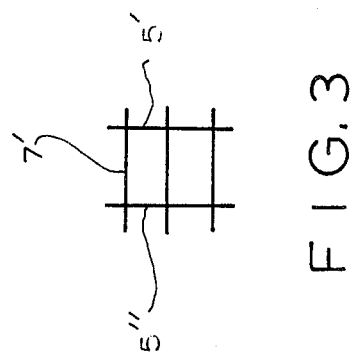
FIG. 3 is a view showing another embodiment of the cleaning element in accordance with the present invention, shown in an end view without the tire.

Several circumferential members 5 can be fitted onto the tire 1. It is possible to arranged them so that each of them is received in a respective one of the circumferential grooves on the outer surface of the tire. The circumferential members which are identified in FIG. 3 by reference numerals 5' and 5" can be connected with one another by transverse members 7'.

As can be seen from FIG. 1, the outer surface of the cleaning element is provided with projections identified by reference numeral 8. The projections 8 contribute to the engagement of the cleaning element with soil, snow, ice etc. The projections can be pointed as shown in FIG. 1. The projections can also be formed by the transverse members 7 shown in FIG. 2. In the latter case the transverse members 7 are formed so that they project radially outwardly beyond the outer diameter of the circumferential member 5.

The invention is not limited to the details shown since various modifications and structural changes are possible without departing in any way from the spirit of the present invention.

What is desired to be protected by Letters Patent is set forth in particular in the appended claims.

I claim:

1. An element for removing dirt or snow from tires having grooves, comprising:
    a closed substantially rigid member arranged so that it can be fitted onto a tire and at least partially received in its circumferentially extending groove, said member having such a radial dimension that one portion of said member is pressed by the ground into the circumferential groove at the location of contact of the tire with the ground, and upon rotation of the tire when the one portion moves out of the location of contact and a new portion of said member moves into the location of contact, said one portion of said member displaces radially outwardly and dislodges dirt and snow from the tire.

2. An element as defined in claim 1, wherein said member is formed as a circumferentially extending member arranged to be partially received in the circumferential groove of the tire; and further comprising at least one transverse member connected with said circumferentially extending member and extending transversely to the latter so as to be at least partially received in a transverse groove of the tire, said transverse member being movable together with said circumferentially extending member radially inwardly at the location of contact and radially outwardly outside said location to be received into and to displace outwardly from said transverse groove of the tire, respectively.

3. An element as defined in claim 2, comprising a plurality of such transverse members receivable into and displaceable outwardly from a plurality of transverse grooves of the tire.

4. An element as defined in claim 1; and further comprising a second such closed substantially rigid member extending substantially parallel to said first member and connected with the latter by at least one axially extending connecting member, so that said second rigid member can be received in a second circumferential groove on the tire.

5. An element as defined in claim 1, wherein said member has an inner surface and an outer surface; and further comprising a plurality of ground engaging projections provided on the outer surface of said member and spaced from one another so as to leave projectionless areas therebetween.

6. A tire unit, comprising
    a tire having an outer surface provided with grooves; and
    an element for removing dirt or snow from the tire and formed as defined in claim 1.

* * * * *